(12) United States Patent
Wilson

(10) Patent No.: US 6,203,939 B1
(45) Date of Patent: *Mar. 20, 2001

(54) HIGH TEMPERATURE BATTERY AND ELECTROLYTES

(76) Inventor: John T. R. Wilson, 736 Lynnhaven La., La Canada Flintridge, CA (US) 91011-2416

( * ) Notice: Subject to any disclaimer, the term of this patent is extended or adjusted under 35 U.S.C. 154(b) by 0 days.

This patent is subject to a terminal disclaimer.

(21) Appl. No.: 09/374,192

(22) Filed: Aug. 13, 1999

Related U.S. Application Data

(60) Division of application No. 08/656,707, filed on Jun. 3, 1996, now Pat. No. 6,022,637, which is a continuation-in-part of application No. 08/059,460, filed on May 7, 1993, now abandoned, which is a continuation-in-part of application No. 07/685,289, filed on Apr. 15, 1991, now abandoned, which is a continuation-in-part of application No. 07/049,853, filed on May 15, 1987, now abandoned, which is a continuation-in-part of application No. 06/663,949, filed on Oct. 23, 1984, now abandoned.

(51) Int. Cl.$^7$ .................................................. H01M 6/36

(52) U.S. Cl. ............................ 429/112; 429/68; 429/103; 429/113

(58) Field of Search .................................. 429/103, 112, 429/67, 68, 113, 62, 188

(56) References Cited

U.S. PATENT DOCUMENTS 3,607,438 * 9/1971 Coffield .............................. 136/154

* cited by examiner

Primary Examiner—Kathryn Gorgos
Assistant Examiner—Thomas H Parsons
(74) Attorney, Agent, or Firm—Robert A. Green; Christie, Parker & Hale

(57) ABSTRACT

A high temperature battery of one or more cells is disclosed in which each cell is made by holding an anode electrode and a cathode electrode, of different metallic substances, together through a fused flux wetted to an electrode, which fused flux is an electrolyte, to make an anode-to-cathode contact, and the anode-to-cathode contact is heated, by a heat source, to a high temperature above a threshold temperature to generate voltaic voltage, in excess of any thermoelectric voltage; such batteries with electrodes of various configurations are disclosed. The heat-activated flux and electrolyte, such as borax, may have, vegetable-growth ashes or chemical constituents of ashes, such as lithium carbonate, added to the heat-activated flux and electrolyte to catalyze or improve the current-generating capability of the battery. The preferred anode substance is aluminum, and the preferred cathode substance is copper. With the preferred cathode and anode substances and a heat-activated flux and electrolyte of fused borax between the cathode and anode, the open circuit voltage generated per cell when heated increases from 0.05 volts at 304° C. to 1.3 volts at 651° C.; the threshold temperature in this case is 279° C. Also disclosed is means to move the anode metal with respect to the cathode metal, when the heat-activated flux and electrolyte is fluid, for changing the battery characteristics and for replacing depleted heat-activated flux and electrolyte.

31 Claims, 7 Drawing Sheets

HIGH TEMPERATURE BATTERY AND ELECTROLYTES

CROSS-REFERENCES TO RELATED APPLICATIONS

This application for patent is a Divisional application from Ser. No. 08/656,707 filed Jun. 3, 1996, now U.S. Pat. No. 6,022,637, which is a Continuation-In-Part of Ser. No. 08/059,460 filed May 7, 1993, abandoned, which is a Continuation-In-Part of Ser. No. 07/685,289 filed Apr. 15, 1991, abandoned, which is a Continuation-In-Part of Ser. No. 07/049,853 filed May 15, 1987, abandoned, which is a Continuation-In-Part of Ser. No. 06/663,949 filed Oct. 23, 1984, abandoned, all of which were titled HIGH TEMPERATURE BATTERY.

Cross reference is made to a related International Publication Number WO 82/01104, published Apr. 1, 1982 titled "Multiple Windings Electrical Motors Controllers", in which a battery is shown as a power source.

PROPERTY RIGHTS STATEMENT FOR THE HIGH TEMPERATURE BATTERY

The applicant was solicited Jun. 25, 1987 and Apr. 30, 1991 on form PTOL-456 by the U.S. Patent and Trademark Office on behalf of the National Aeronautics and Space Administration for a property rights statement regarding the HIGH TEMPERATURE BATTERY, the title of the application at that time. The property rights statement submitted included the following.

I accidently discovered the generation of voltage while conducting an experiment at my home to investigate the electrical characteristics of heated wood ashes; the HIGH TEMPERATURE BATTERY derived from this experiment. My interest in electrical characteristics and in heated wood ashes in fireplace fires began in my boyhood.

I constructed and conducted the experiment as follows. I constructed from copper a retainer for wood ashes, which copper was also an electrode in this experiment, as follows. I silver soldered a ⅜ inch diameter copper tubing stub in the center of a copper plate, about two inches square and 0.043 inches thick, to cover the tube stub lumen at one end with the copper plate; I used silver solder and an Oatey silver flux I had purchased from Montgomery Ward. I made an electrical wire connection to the copper plate through a small hole drilled in the copper plate. For a second electrode to use in electrically measuring the wood ashes I cut a piece, about three inches square, from a short roll of window screening, which piece I intended to place on and in the wood ashes; the window screening was aluminum. I arranged the experiment on a small flat scrap of ceramic and on a concrete surface at my home. I filled the open-end-tube-stub lumen with wood ashes and covered the rest of the copper plate with wood ashes. I connected one lead of my multimeter, Phaostron Model 555 A V.O.M., to the wire connected to the copper plate; I connected the second lead from my multimeter to the piece of aluminum screen. I set the multimeter function switch to read OHMS and the range switch to R×10K. I ignited my propane torch. With one hand I manually positioned the piece of aluminum screen on top and in the wood ashes, and I watched the multimeter scale indication as, with my other hand, I manually positioned the propane torch to heat the wood ashes. I expected a decrease in resistance of the wood ashes with increasing temperature. Instead, the multimeter indicated intermittently between a full scale deflection (zero ohms) and no deflection (infinite ohms). I changed the multimeter function switch to D.C.V. (DC volts) and the range switch to 1.5V and then to 5V. With these switch settings the multimeter indicated intermittently between zero volts and about 1.5 Vdc. This was a surprising result which raised questions I could not then answer. I knew that flames and torches were diodes, and diodes could be thermionic voltage A sources. I had learned that a flame is a diode while working at Barber-Colman Company in Rockford, Illinois from 1950 to 1956; the Barber-Colman Company made a furnace fuel safety shutoff controller based on a flame diode characteristic. I made no further experiments along this line to resolve these questions for many years.

When I resumed experimenting along these lines I was able to define the source of the voltage and to obtain a steady, rather than intermittent, voltage reading. I determined by test and observation that the voltage was generated independently of the ashes or the torch flame, and that it was due to the aluminum screen touching the copper through residual spots of the Oatey silver flux when the aluminum, copper and flux were above a certain temperature. I determined that the flame was not necessary for the voltage to be generated, since the voltage persisted when the flame was removed and while the copper, aluminum and flux were hot; the voltage generated decayed gradually after removal of the torch flame as the temperature of the battery elements decreased.

I initially had no idea about the composition of the Oatey silver flux. By reading my 1965 Encyclopedia Britannica under the heading Soldering and Fluxes I learned that: "Borax is a common flux for hard soldering or brazing processes which use filler metals melting above 700° C"; thus, I suspected borax was the important ingredient of the Oatey silver flux. Also, under the heading Borax in my encyclopedia is stated that borax "finds application as a soap supplement". From this reminder about borax soaps I bought some "Boraxo" powdered hand soap and tried it instead of the Oatey silver flux; some of the "Boraxo" ingredients smoked and burned in the torch flame, but the ingredient(s) which remained yielded the same battery voltage as the Oatey silver flux. Further, I bought some borax powder technical from Los Angeles Chemical Company and tried it instead of the Oatey silver flux, and the borax powder technical yielded the same battery voltage as the Oatey silver flux. From these results I concluded borax was the flux ingredient giving the battery performance I observed.

I wanted to investigate a series connection of two HIGH TEMPERATURE BATTERY cells to obtain a higher voltage. I made a two-cell HIGH TEMPERATURE BATTERY using the original square copper plate cut into two pieces. I heated both cells with my torch flame. As expected, I measured about three (3) Vdc, twice the voltage of one cell, and the torch flame did not short circuit the battery voltage. I reasoned that my propane torch was a diode and at the propane flow setting used the flame reverse breakdown voltage was greater than 3 Vdc.

BACKGROUND OF THE INVENTION

1. Field of the Invention

The high temperature battery in accordance with the present invention is a primary, thermal battery and does directly convert energy into electricity.

2. Description of the Related Art

The following descriptions of primary batteries, thermal batteries and direct conversion of energy into electricity are presented to indicate the prior art in these subjects.

The following definition of a battery is taken from the *Encyclopedia Britannica*, 1965, Volume 3, pages 281 and 282. (Note that an anode and a cathode of a battery have a different polarity than the anode and cathode of a device which consumes electric current.):

BATTERY.

The term battery, as commonly used in electricity and electrochemistry, refers to a device for converting chemical energy directly to electrical energy. The mechanism of the process involves the arrangement of chemicals in such a manner that electrons are released in one part, or electrode, of the battery and caused to flow through an external circuit to the other part, or electrode. Such batteries are called voltaic cells.

The part of the battery at which the electrons are released to the external circuit is called the anode, or the negative electrode or pole; the part that receives the electrons from the external circuit is called the cathode or the positive electrode or pole. (The terms anode and cathode are used here in the accepted scientific sense in referring to components of a battery that produces electric current; in a device that consumes current—e.g., an electroplating cell, an electron tube, etc.—the term anode is commonly applied to the positive electrode while the negative electrode is called the cathode.) Familiar examples of batteries are the so-called dry cells used in flashlights, lead-acid batteries used in automobiles and mercury batteries used in hearing aids.

A primary battery is a non-rechargeable battery such as the common carbon-zinc or alkaline battery, and a secondary battery is one that can be recharged; these were extracted from "Batteries: Today and Tomorrow" by Don Mennie in the IEEE Spectrum of March 1976, pages 36–41.

The following thermal battery description is taken from High *Energy Batteries* by Raymond Jasinski, Plenum Press, New York, 1967, page 96 and following. In FIG. 3-3 "Fused salt" electrolytes are shown as operating from about 300° C. to about 1, 000° C.

Batteries employing this type of electrolyte are generally referred to as "thermal" batteries because of their heat-activation characteristics.

The cells are stored at ambient temperature, with the electrolyte a solid. This provides for a low self-discharge rate and a long storage life. When fused, the cells are capable of high discharge rates for short times. It has been in this area of high discharge rates (greater than 1 amp/sq.inch) (greater than 0.155 amp/sq.cm.) that the thermal battery has found most application.

In pulse performance at 70OF (21° C.) (Jasinski, page 211, reference FIG. 6-2), the molten salt/thermal battery exceeds all other types of batteries with a voltage per cell (VPC) of 2.0 volts and a discharge rate of 1.085 amps/sq.cm. (reference FIG. 6-2). Further, from Jasinski, pages 97–98:

The conductivities of molten salts are from 10 to 100 times higher than those of aqueous systems, so that molten salt cells should have low voltage losses due to the IR drop . . . The use of high currents requires that considerable attention be paid to elimination of ohmic resistance in other parts of the battery, e.g., contact resistance within the leads . . . At corresponding temperatures relative to the melting point, simple ionic salts do not possess physical properties radically different from other liquids.

Further, from Jasinski, page 111, under . . . Cell Materials—General, Negatives:

Aluminum. The equivalent weight of this material is 9. A high temperature cell has been described (Reference Publication A 280: L. Antipin, *Zh. Fiz. Khim.* 30; 1425 (1956) (C.A. 51: 6394 i)) which has an aluminum negative and an $O_2$/Cu positive. The electrolyte consisted of 40.5% $AlF_3$, 57.85% NaF, and 2.65% $Al_2O_3$.

The following definition of an electrolyte is taken from the *Encyclopedia Britannica*, 1965, Volume 8, page 230.

"ELECTROLYTE, in chemistry and physics, a substance which conducts electric current as a result of a dissociation into positive and negative ions, which migrate toward and frequently are discharged at the negative and positive electrodes, respectively. In those instances in which an ion is not discharged at a given electrode, some other substance present in the solution or forming part of the electrode is instead always oxidized at the positive electrode or reduced at the negative electrode. The most familiar electrolytes are acids, bases and salts, which ionize in solution in such solvents as water, alcohol, etc. Many salts, such as sodium chloride, behave as electrolytes when melted in the absence of any solvent; and some, such as silver iodide, are electrolytes even in the solid state."

The following excerpts concerning battery electrolytes were taken from page 72 of "Electrochemical Vehicle Power Plants" by D. A. J. Swinkels, IEEE Spectrum, May 1968, pages 71–77 . . .

If the reaction product of the electrochemical reaction can serve as the electrolyte rather than being dissolved in another fluid, a simpler and potentially lighter system will result. This often occurs with fused-salt electrolytes . . . The power capacity of a battery is to a large extent determined by the ratio of the open circuit voltage (OCV) to the resistance of the electrolyte. The higher the OCV and the lower the electrolyte resistance, the higher the power density that can be attained, which leads to the selection of very active electrode materials to obtain the high OCV and to fused-salt electrolytes because of their low resistivities. Typical resistivities are 0.1 to 1.0 ohm-cm for fused salts, 1 to 10 ohm-cm for aqueous electrolytes, and 100 ohm-cm and greater for organic electrolytes and solid electrolytes. Electrolyte resistance is given by pl/A where p is electrolyte resistivity, 1 is electrolyte thickness, and A is electrode area, so that low resistances can be obtained even with high-resistivity electrolytes if they can be made sufficiently thin. Glass can be an ion conductor using positive sodium ions with a resistivity of about 100 ohm-cm at 300° C. However, by making the glass membrane thin (say $10^{-3}$ cm) and using a large area the internal resistance of a battery can still be kept low.

The following excerpts about borax are taken from the *Encyclopedia Britannica*, Volume 3, 1965, pages 951 and 952 under the heading: Borax.

"Borax, a colourless substance, found in major quantity in the salt deposits of California and also in Chile, Tibet, Peru and Canada. It has an alkaline taste and is moderately soluble in water. When heated borax foams vigorously, losing the water shown in its formula ($Na_2B_4O_7.10H_2O$), and melts to form a clear glass. Molten borax dissolves many metallic oxides or salts to form boron glasses, some of which have characteristic colours.

Borax is used for the removal of oxide slags in metallurgy and in welding or soldering, for the detection of metals and for the production of coloured glazes on pottery. It is an important ingredient in many glasses and in enamels for ironware. It also finds application as a soap supplement or water softener. The discovery of the role of borax in plant nutrition led to the extensive use of borax in fertilizers . . .

. . . Although molten borax acts as an acid toward metal oxides, because of the excess of boron oxide in the formula (empirically $2NaBO_2.B_2O_3$), the aqueous solution is alkaline because of hydrolysis . . .

All polyborates of known structure contain the $BO_3$ unit, in which a boron atom is at the centre of an equilateral triangle outlined by three oxygen atoms. Such units share oxygen atoms to form condensed systems . . . "

The following excerpt about borax glass when molten is taken from *Boron, Metallo-Boron Compounds and Boranes*, edited by Roy M. Adams, published by John Wiley in 1964, page 148:

"3. Electrical Conductivity: The electrical conductivity of molten borax is less than that of most other molten salts (520). Since the negative ions form an immobile network, the conductivity of borax glass is due only to the sodium ions (524)."

As noted above, borax dissolves oxides on metal. Ashes are metal oxides as stated in the following dictionary definitions. The large *Webster's Third New International Dictionary* (1986) defines "ash" as: "1.b: the solid residue of nonvolatile oxides or salts of metals (as sodium, calcium, magnesium, iron) or of non-metallic atoms (as silica) or of pure metal (as platinum) left when combustible substances (as plants, foods) have been thoroughly oxidized (as by nitric acid or some other wet oxidizing agent) and frequently used in quantitative analysis as a measure of the mineral-matter content of the original material." The smaller, *Webster's Ninth New Dictionary* (1983) defines "ash" as: "the solid residue left when combustible material is thoroughly burned or is oxidized by chemical means." *The Pocket Oxford Dictionary, Fifth Edition* (1976) defines "ash" as: "Powdery residue left after combustion of a substance."

The *Kingzetl's Chemical Encyclopedia* by Bailliere, Tindall and Cursell, 9th Edition (1966) at pages 82 and 83 presents the following about "ashes":

All vegetable growths, as well as coal, peat, and lignite leave ashes when burned, and all of them contain some alkali. Potash was originally produced from the ashes of plants. (See Potassium.) Estimated as $K_2O$, it amounts to ca. 10% in the ash of straw, and 42% in that from peas. The potassium oxide is associated with varying amounts of sodium oxide, calcium oxide, magnesium oxide, iron oxide, sulphur (in the form of sulphates), silica, carbon dioxide, and phosphoric acid. The woods that yield the greatest amount of potassium are wormwood and fumitory . . . The ash of plant material amounts to approximately 4%, and contains the following elements (in decreasing order of abundance): potassium, sulphur, magnesium, phosphorous, silicon, calcium, sodium, iron, aluminum, chlorine and manganese.

The following excerpts about potash, lithium, polonium and tobacco are taken from *The Chemistry of the Elements* by Howard Nechamkin, McGraw-Hill, 1968:

Page 15:

Many lithium salts are only sparingly soluble in water ($LiF$, $Li_3PO_4$, $Li_2CO_3$) whereas the corresponding salts of the other alkali metals are water soluble.

Page 25:

The ashes of plant materials contain potassium carbonate (potash); very little sodium carbonate (soda) is found in such ash except for that of plants growing in or near the sea. Interestingly, lithium carbonate is found in the ashes of the tobacco plant.

Page 139:

Polonium . . . The metal is low melting (mp=254° C.) and boils at 962° C. It is a very rare and highly toxic metal and is strongly radioactive . . . The oxide, $PoO_2$, is also red and loses oxygen on heating.

There is evidence that $Po^{210}$, a natural contaminant in tobacco and a strong alpha emitter, may be a contributory cause of bronchial cancer in smokers.

The following excerpt about lithium is taken from the *Encyclopedia Britannica*, 1965, Volume 14, page 109, under the heading of Lithium.

Lithium, a chemically reactive metallic element which resembles somewhat the other alkali metals, sodium, potassium, rubidium and caesium with which it is classified in group I of the periodic system. However, as the first member of the group, lithium is unique and has certain properties which render it distinct from its congeners and somewhat similar to magnesium and several other metals of group II. For example, lithium is the only element of its group to react with nitrogen to form a nitride, $Li_3N$, whereas all of the metals of group II undergo a similar reaction. It is also unusual in that it is the lightest of all solid elements and at ordinary temperatures has a higher specific heat than any other substance except water . . .

The following about lithium is extracted from the *Encyclopedia Britannica*, 1965, Volume 14, page 109, under the heading of Lithium, Table I.—Uses of Lithium. Lithium carbonate is applied in tobacco culture, porcelain enamels, production of miscellaneous lithium compounds, desulfurization of steel and as a catalyst in the plastics field. Lithium chloride and lithium fluoride are applied as fluxes for welding aluminum and welding magnesium in the welding field.

The following excerpt about lithium is taken from the *Encyclopedia Britannica*, 1965, Volume 14, page 109, under the heading of Lithium, Uses.

Uses.

Lithium was generally unknown and had few uses for more than a century after its discovery. The United States, the world's largest producer, averaged 290,000lb. of lithium carbonate (or its equivalent) per year for 1935–39. During World War II a peak of 2,790,000 lb. was reached (1944); this was exceeded in every year after 1950, reaching more than 30,000,000 lb. per year in the 1960s. The metal has been used as a constituent of certain light metal alloys, with magnesium and aluminum-zinc alloys and in heavy-duty lead bearing alloys. It is used as a degasifier in the production of high-conductivity copper and bronze castings and is also used in the synthesis of vitamin A. Lithium compounds are used in lubricants and ceramics, which consume the largest quantities, and in air conditioning, welding and brazing.

The following excerpt about lithium is taken from the *Encyclopedia Britannica*, 1965, Volume 14, page 110, under the heading of Lithium, Occurence and Production.

Occurence and Production.

It is estimated that lithium constitutes about 0.0065% of the igneous rocks of the earth. Because of its high chemical activity, the element occurs only in combination and its compounds are widely distributed but in small concentrations. Traces of lithium are found in animal tissue, plants (especially tobacco), the soil and a large number of minerals. Small quantities occur in sea water and in some springs. . .

Lithium metal is obtained by the electrolysis of a fused lithium chloride and potassium chloride salt mixture containing 40%–50% of lithium chloride. Other methods of reduction have been tried but fused salt electrolysis is the process used commercially.

The following excerpt about lithium is taken from the *Encyclopedia Britannica*, 1965, Volume 14, page 110, under the heading of Lithium, Compounds.

Compounds.

The compounds of lithium are predominantly ionic and their chemical properties are in part those of the lithium ion. This ion, the smallest of the alkali group, attracts an electron more strongly than the others and is more easily reduced to the metal. It also attracts water molecules most strongly with the liberation of a large amount of energy, thereby facilitating the reaction of lithium metal with water. As a result, lithium has a high electrode potential in water solution, greater than that of cesium, instead of the lowest of the group which might be expected from the ionization potential.

Lithium hydride is a white solid with a crystalline structure of the sodium chloride type and a melting point of 688° C. Electrolysis of the fused compound liberates lithium at the cathode and hydrogen at the anode. It is typical of the class of "saltlike" hydrides which are formed by the elements of groups I and II. Lithium aluminum hydride, $LiAlH_4$, and lithium borohydride, $LiBH_4$, in common with lithium hydride are strong reducing agents and react with water to liberate hydrogen and form the metal hydroxides. Lithium aluminum hydride is extensively used as a reducing agent in organic synthesis.

Lithium carbonate, $Li_2CO_3$, a sparingly soluble salt, is used in the preparation of a number of other lithium compounds, in ceramics for producing glazes and in manufacturing special grades of glass. The bicarbonate, $LiHCO_3$, is soluble in water. Lithium fluoride, LiF, has the highest heat of formation of all the alkali halides and is one of the most stable compounds known. It is somewhat insoluble and is used in soldering and welding fluxes."

The following excerpt about potassium is taken from the *Encyclopedia Britannica*, 1965, Volume 18, pages 321–323 under the heading of Potassium.

Potassium is not found in a free state in nature, but in combined forms is distributed in nearly all soils and terrestrial waters and many rocks. It is one of the elements important for the nutrition of plants, and its compounds are contained in most plant and animal tissues.

. . . The history of potassium is closely linked to that of sodium.

. . . Soluble potassium salts which are present in all fertile soils are drawn into the roots of plants and accumulate in the plant structure.

. . . Potassium belongs to the group of the alkali metals (Group 5 of the periodic system) and closely resembles the other elements of the group, lithium, sodium, rubidium, cesium and the short-lived radioactive element francium.

. . . Potassium forms three oxides, and a fourth of less certain existence has been reported. Potassium superoxide, $KO_2$, the most common of the superoxides, first prepared by Gay-Lussac and Thenard, is made by heating the metal in air at 180° C. to 200° C. or by treating a liquid ammonia solution of the metal with oxygen at −50° C. . . . The melting point is 380° C. and the density is 2.15 grams per cubic centimeter. It is paramagnetic . . . "

The following excerpt about thermistors (the word is a contraction of "thermal resistors") is taken from *Measurements in Electrical Engineering, Part One,* by Roland B. Marshall, Second Edition, (1948), page 143: "A thermistor is a semi-conductor formed from the oxides of various metals such as manganese, nickel, cobalt, and copper. The oxides are pressed into shape and "fired" under carefully controlled conditions with the result that ceramic-like structures are formed. Their temperature coefficients are negative and range about ten times as high as those of metals."

The following description of direct energy conversion is taken from the *Encyclopedia Britannica* (1965), Volume 8, pages 387–388, under the heading: Energy Conversion, Direct.

Direct conversion is a rather loosely defined term covering processes in which heat or radiation is transformed direct to electricity rather than first to mechanical energy and then to electricity. Direct conversion has several advantages, among the most important of which is that electricity can be generated by devices employing no moving parts. Some of the phenomena—such as the generation of an electrical potential difference in a circuit consisting of two dissimilar metals with the junctions at different temperatures, and the flow of electricity which occurs when metal plates are illuminated with ultraviolet light—have been known for many years. These phenomena were discovered by T. J. Seebeck in 1826 and by H. R. Hertz in 1887, respectively.

Thermoelectric Devices.

Thermoelectric phenomena came into existence because of the tendency of charged particles (both negatively charged electrons and positively charged "holes") to travel from the hot end of the material to the cold end. If one had a material with an initially uniform density of electrons independent of temperature, then—since the electrons in the hot end would be moving faster than those in the cold end—there would be a tendency for more electrons to leave the hot end and travel into the cold end than vice versa. However, as soon as a few electrons had diffused to the cold part, they would give rise to an electrical field which would discourage further flow of electrons to the cold part, thus bringing about a steady-state condition. Another phenomena that can bring about a flow of charged particles from one end to the other occurs when the density of free carriers increases with increasing temperature, in accordance with the same type of equation that describes the increase in water vapour pressure with temperature.

Thus, if there are many more free electrons at the hot end of the material, there is a strong tendency for them to diffuse through the material to the cold end, raising it to a negative potential. Experiments with a variety of materials show that the cold end could become either negatively charged or positively charged. The reason for this is that in semiconductors or metals the current can be carried either by electrons or by holes. Thus, in order to obtain the maximum voltage or current in a thermoelectric circuit, one leg should be composed of a material in which current is carried by negative carriers and the other of a material in which current is carried by positive carriers. In other words, the temperature gradient or heat flow in both legs is in the same direction but the electrical currents flow up one leg and down the other, thus reinforcing each other.

When current flows from one material to another there is an abrupt change, across the junction between them, in the environment in which the charged particle is moving. This gives rise to what is called a Peltier heat. The process is analogous to the change in energy of an ion when it moves from one solution to another through a membrane. There is a thermodynamic relationship between this Peltier heat, the temperature difference and the thermoelectric potential difference, a relationship known as the Seebeck voltage, generated when the circuit is broken and the electrical potential measured . . .

Thermionic Devices.

Thermionic devices consist of evacuated or plasma-filled cells in which electrons are boiled out of a hot anode and are collected at a cold cathode. Thomas A. Edison applied for a patent in 1883 on a direct-conversion device utilizing thermionic emission, although at the time he was not aware of the physical principles of the device. The Edison tube was essentially one of his carbon-filament light bulbs into which he inserted an extra electrode. Of particular interest was the nuclear-heated cell that was successfully tested at Los Alamos, N. M., atomic energy laboratory in 1958. The cathode consisted of uranium-zirconium carbide and, when it was heated to bright incandescence by placing it in the Omega West reactor, it produced 20 amp. at 0.5 v. Both thermoelectric and thermionic converters are low-voltage, high-current devices. A typical 100-watt thermoelectric stage produces 1,000 amperes at 0.1 volts, while a typical 100-watt thermionic cell produces 100 amperes at 1 volt. Units must be arranged in series and parallel to produce the desired output voltage and current.

Some other Direct-Conversion Devices.

The vacuum phototube is very similar to a thermionic device, except that the electrons are liberated from the cathode in a quantum process in which a light photon gives up all of its energy to free the electron and increase its kinetic energy. Those electrons liberated near the surface which have energies greater than the work function can escape. The solid-state analog to a photocell is a P-N semiconducting junction. At a P-N semiconductor junction the extra electrons and holes that are formed during the absorption of light are separated by the internal electrical fields existing in the semiconductor.

A thermally regenerative fuel cell represents another class of direct-conversion devices. (In one such device,) lithium and hydrogen are burned in the fuel cell at a temperature of 450° C. The lithium hydride formed is then thermally decomposed at a higher temperature, about 850° C., to produce free lithium and hydrogen, which are returned to the fuel cell for recombination.

The thermoelectric voltage for an aluminum-against-copper (Al—Cu) thermocouple junction can be obtained from the thermoelectric voltages of aluminum (Al) with platinum (Pt), 3.8 uV/° C., and of copper with Pt, 7.4 uV/° C., and combining them and eliminating the Pt to get 3.6 uV/° C. for an Al—Cu thermocouple. These thermoelectric voltages are obtained from a "Table III: Thermoelectric Effect in Metals" under the heading: "Electricity, Conduction of" in the *Encyclopedia Britannica,* Volume 8, (1965), page 194. As an example of the thermoelectric voltage from an Al—Cu thermocouple: if the temperature at the heated junction of an Al—Cu thermocouple is increased to 600° C., a temperature delta of 575° C. will be obtained (assuming the cold junction is 25° C.), which will produce a thermoelectric voltage of 2.07 millivolts (0.00207 volts DC); this is 575° C. multiplied by 3.6 uV/° C.

DESCRIPTION OF THE RELATED ART

The high temperature battery is a new concept; however, it is founded upon previous technology such as the chemistry of borax, soldering, techniques for joining aluminum to copper, and the effect of adding ashes to a battery electrode. A brief description of this previous technology is presented here as background for the present invention.

From the foregoing Technical Field references about borax and electrolytes and from a U.S. Borax Technical Datasheet IC-1a, some brief characteristics of borax are: " . . . When heated above 144° F. borax melts in its own water, swells to a frothy mass, and when fully dehydrated at increasing temperatures it fuses to a clear glass", "molten borax acts as an acid toward metal oxides", "the affinity of fused borax for metallic oxides renders it extremely useful as a flux", "the electrical conductivity of molten borax is less than that of other molten salts", and "the anhydrous (lacking water) form of borax melts at 742° C."

The following is from the *Encyclopedia Britannica,* 1965, Volume 20, pages 939A–939B, under the heading: Soldering.

Soldering and brazing are processes for joining metals by the application of heat. A common characteristic of both processes is the use of a filler metal or alloy which melts and wets the surfaces of the joint at temperatures below the melting points of the metals being joined. The distinguishing difference between the processes is the strength of the joint and the temperature required for making it. Soldered joints are weaker than brazed joints and the soldering process relates to joints made at temperatures below 427° C. Brazing (including hard soldering) in most applications required temperatures from 540° C. to 1,177° C. Soft Solders.—The common soft solders consisting of lead and tin are the principal alloys used in the lower temperature range. The lead content may vary from 30% to 60% with the balance tin . . .

Lead-tin alloys high in tin can be used in joining aluminum but aluminum alloys in the melting range of 540° C. to 600° C. are preferred . . .

Hard Solders and Low-Temperature Brazing Alloys.

Filler metals in the temperature range above 427° C. include a large number of compositions starting with aluminum solders melting at approximately 600° C.

and running to copper at 1,079° C. and nickel alloys between 1,038° C. and 1,093° C. Proprietary aluminum alloys containing from 5% to 12% silicon with small additions of other metal are widely used . . .

Brazing Solders.

The spelters or brazing solders are composed of copper and zinc with addition of 1% to 3% tin in some of the alloys. Those containing equal parts of copper and zinc are the common spelters which have been in general use for many years and are fluid at 871° C. Another group containing copper, zinc and nickel are used with iron, steel and nickel or nickel alloys and melt at 927° C. or higher . . .

Fluxes.

Oxide films must be prevented from forming on the joint surfaces or the alloy during the heating process and some type of flux or protective atmosphere is necessary. When the copper-phosphorous alloys are used for joining copper the phosphorous acts as a deoxidizer, but on copper alloys some flux is desirable. For lead-tin alloys in the lower range, resin or zinc chloride made by dissolving zinc in hydrochloric acid is used. The latter is referred to as an acid flux and these lead-tin alloys are supplied in tubular form with resin or zinc chloride cores. When the alloy is used in granular form the flux can be mixed with the alloy. The flux must be fluid and active at a temperature below the melting point of the alloy being used as a filler metal. An effective flux for soft soldering iron, steel, nickel or nickel alloys is a mix of 71% zinc chloride and 29% ammonium chloride. Plumbers use tallow or stearin when making wiped joints on lead pipe. The mild fluxes such as resin, tallow and stearin do not actively dissolve oxides but offer protective coatings.

Borax is a common flux for hard soldering or brazing processes which use filler metals melting above 704° C. The extensive use of the silver brazing alloys melting at temperatures below 649° C. has necessitated the development of fluxes that are fluid and active at 593° C. Combinations of borates, fluorides and chlorides provide fluxes which are fluid at temperatures from 371° C. to 593° C. For aluminum soldering, combinations of chlorides and fluorides are used. Borates combined with fluorine compounds are used with the low-temperature silver brazing alloys and are fluid and active at 593° C.

Heating.

There are many satisfactory methods of heating depending upon temperature required and size and shape of parts being joined. In the soft soldering range, soldering irons, torches, induction heating and furnaces are used. Soldering irons are small at blocks of copper pointed at one end. They are heated electrically or with a blow torch or small furnace. They must be large enough and be heated to a temperature which will not only melt the filler metal quickly but also heat the surface of the joint to a temperature above the melting point of the filler metal as the soldering iron is drawn along the joint. This method of heating is suitable for soldering thin sheet metal, wires, electrical connections and small parts. Torches are used for large parts and special furnaces and conveyor systems are installed when large quantities are to be soldered. Baths of the molten filler metal are used when the parts can be securely fastened in jigs and the joint dipped just below the bath surface.

Heating for hard soldering or brazing is done with torches, inductive heating, electrical resistance, furnaces, molten salt baths and baths of molten filler metal. The wide use of these processes in industry has led to the development of special furnaces and automatic equipment with particular attention to accurate control of the temperature and careful regulation of the atmosphere.

In the preferred embodiment of this invention, which uses aluminum anodes and copper cathodes, an aluminum-wire-to-copper-wire splice is made at interconnections between cells. Such electrical splices that will not self-heat are desirable and can be obtained by using brass as an intermediate metal as noted in the following excerpts from an article in the IEEE Spectrum magazine of May 1984, page 17.

The problems with aluminum wiring splices and connections .". implicated three characteristics of aluminum that differ from those of copper. Two such characteristics of aluminum are its coefficient of thermal expansion and rate of cold flow, both of which are significantly greater than those of copper. The third characteristic is that aluminum's oxide forms more quickly, is more tenacious, and is much less conductive than the oxide that forms on exposed copper surfaces . . . "

The problems were solved when "a two-part solution was put into effect by Underwriters Laboratories, Northbrook, Ill. The terminals on the fixtures used with aluminum wiring were changed, as was the wiring itself. Aluminum wiring systems that incorporate these changes are known as new-technology systems. The new-technology electrical fixtures were introduced by UL in June 1972, and have terminals with wide brass screws to hold electric wire more securely. These fixtures, known as CO/ALR devices, can be used with either copper or aluminum wire. More stringent requirements for the aluminum wire used in circuits, introduced in 1971 by UL, led to wire with better thermal and conductive properties. In 1976, the U.S. National Bureau of Standards issued a report on a study of glowing electrical connections. The report concluded that electrical connections are most likely to overheat and glow at either aluminum-steel or copper-steel interfaces. The bureau was unable to develop a glow in either an aluminum-brass or a copper-brass interface, although a loose connection in either interface sometimes led to arcing or sparking."

The addition of powdered, vegetable-growth ashes to an electrode to enhance battery performance is described in the following excerpt as the addition of ashes to the electrode cuprous chloride to surprisingly improve battery performance. This excerpt is from Patent Pending by Richard L. Gausewitz, published by Devon-Adair in 1983, pages 56 and 57 as follows:

"Adams melted the cuprous chloride in a crucible on the kitchen stove, shaped it in small, handmade molds, and assembled battery after battery in baby food jars. The molten black compound smelled so foul that Emma (his wife) was often forced out of the room; eventually, the landlord asked them to move.

Bert Adams was a heavy smoker, the kind one invariably sees with a cigarette in his mouth, its ash growing longer and longer until it falls of its own weight. One night, while he was engrossed in his experiments, the ashes from his cigarette dropped into the melting cuprous chloride. Although he feared the mixture might be ruined, he had no place to dispose of it; so, hoping for the best, he continued cooking it and then fabricated his battery in the usual way.

This time the needle jumped when he connected the meter—the current he had long been looking for was finally being generated. 'I got it, I got it!' he yelled, startling Emma out of her sleep and causing her to think he might have injured himself, 'because he would get burned quite a bit trying to lift the crucible; he was a very excitable person and worked very fast.'

What Bert Adams had was a battery that would light a small bulb and produce a substantially constant voltage for the lifetime of the battery (roughly thirty hours at first). This was in striking contrast to conventional lead-acid batteries, in which voltage decreased as the battery operated. Adams' battery, furthermore, could sit on a shelf for a long time and then be activated merely by adding water. It was thus an excellent reserve battery capable of performing any number of emergency chores.

Exhilarated by his success, Adams set out to perfect his invention. Speculating that the carbon in the cigarette ash had served as a catalyst, he experimented with cathodes impregnated with charcoal, hard coal, powdered graphite, and even sugar. At night he placed the baby-jar batteries on the dresser so that he could watch them. Each had its own bulb, and Emma, a light sleeper, was periodically awakened both by the seven or eight small lights twinkling in the dark and by Bert jumping up to check them.

Eleven days after Pearl Harbor (Dec. 18, 1941), Bert Adams applied for a patent on his battery, which was called the 'Neutro Cell'."

SUMMARY OF THE INVENTION

The invention is a primary battery, and a variable battery.

The primary battery of this invention may be constructed with one or more cells. The primary battery of this invention has a heat-activation characteristic whereby the battery voltages are obtained above a certain temperature; see Table I and FIG. 11 for battery open circuit voltage (OCV) per cell versus battery cathode temperature for the preferred embodiment battery of this invention made with a copper cathode and an aluminum anode and using borax as the oxide removal means on the copper cathode and the resulting fused borax with dissolved copper oxide and dissolved aluminum oxide as the electrolyte means. Other chemical addition to the electrolyte are considered based on the use of wood ashes in the discovery experiment described for the Property Rights statement, and on Bert Adams favorable experience with cigarette ashes in his battery electrode. These chemical additions are considered most commonly as powder added to the powered borax prior to fusing the borax, and chemical additions are also considered as powder additions to the molten borax glass.

Table I: Battery Voltage vs. Temperature Characteristic
Battery Cathode Temperature OCV Per Cell

| °C. | Vdc |
|---|---|
| 279 | 0 |
| 304 | 0.05 |
| 329 | 0.1 |
| 354 | 0.2 |
| 379 | 0.3 |
| 576 | 1.1 |
| 623 | 1.2 |
| 651 | 1.3 |

A single battery cell is comprised of an anode and a cathode of different metals, metal alloys or metallic substances, means to remove and exclude oxides from at least portions of the surfaces of the anode and cathode, electrolyte means which are heat-fused flux means after placement on the anode and/or cathode with at least a portion of the electrolyte means placed and held between at least portions of the oxide-free surfaces of the anode and cathode, means for adding heat-activated flux and electrolyte means prior to being once heat-activated, and removal means for removing heat-activated flux and electrolyte means which have been once heat-activated, wherein the heat-activated flux and catalyst means are one of seventy-one percent zinc chloride and twenty-nine percent ammonium chloride, lithium fluoride, calcium fluoride, sodium fluoaluminate, calcium chloride fluoride orthophosphate, barium fluoride, strontium fluoride, lead fluoride or sodium fluoride means to heat the portions of the electrolyte and the Portions of the anode and cathode surfaces to above the certain temperature, means to hold the electrolyte portion between the anode and cathode, means to maintain electrical connections to the anode and cathode, and thereby, the battery delivers electromotive force as a function of the battery temperature in-excess-of-the-certain-temperature and a first storage means for unused first metal electrode means; a second storage means for removed metal electrode means; an actuation means for moving the first metal electrode means with respect to the second metal electrode means, from the first storage means to the contact means and from the contact means into the second storage means, or vice versa, when the pair of dissimilar metal electrodes and the heat-activated flux and electrolyte means are at a temperature in the operating temperature range and desired. In multiple-cell batteries the different-metal connections between the cells may be made through an intermediate metal, such as brass, to avoid corrosion and/or self-heating. The means to heat the junction may be a torch, an electric resistive heater, or other methods of heating.

Another high temperature battery configuration is made as follows: (1) cover at least a portion of an electrode, such as a copper cathode, with flux, such as borax; (2) heat the flux to fusing to wet the electrode; (3) apply silver solder to the heated electrode through the fused flux; and (4) touch and hold a second dissimilar-metal electrode, such as an aluminum anode, to at least a portion of the silver-soldered electrode through at least a portion of the flux. The battery voltage will be available between the anode and cathode.

Both the preferred embodiment and the above configuration of the high temperature battery cell with an aluminum anode and a copper cathode produce no voltage at battery cathode temperatures below about 279° C.; above the 279° C. threshold battery cathode temperature, also called the certain temperature for these embodiments, the battery voltage generated gradually increases with temperature increases to produce a nominal 1.3 volts direct current at 651° C. cathode temperature. The aluminum melts at 660° C. (1,220° F.); so, the battery cathode temperature is limited to be somewhat below 660° C. when the anode is aluminum. These cell embodiments of the high temperature battery have been operated with the battery temperatures between the 279° C. certain temperature and 641° C., and the battery voltages generated within that range of temperatures were roughly proportional to the battery cathode temperature above the certain temperature.

The variable battery, a primary battery, of this invention may be constructed with one or more cells. The variable battery of this invention has a heat-activation characteristic whereby the battery voltages are obtained above a certain temperature; see Table I for battery open circuit voltage (OCV) per cell versus battery cathode temperature for the preferred embodiment variable battery of this invention made with a copper cathode, or positive electrode or pole, and an aluminum anode, or negative electrode or pole, and using fused borax as the oxide removal means and the electrolyte means. Varying the battery area between the cathode and anode to vary the current generating capability is believed to be another uniqueness of this invention.

The advantages of the high temperature battery over the prior art are not totally known. The use of copper and aluminum as electrodes are expected to be advantageous in reducing the battery internal resistance. The addition of vegetable-growth High Temperature Bate and Electrolytes, DIV, Aug. 19v ashes, tobacco ashes, various chemical constituents of these ashes including metal oxides, or other catalysts to the battery flux or electrolyte is expected to increase the current available from the high temperature battery.

BRIEF DESCRIPTION OF THE DRAWINGS

FIG. 4 shows the location of a cross-section shown in FIG. 6.

FIG. 8 shows the location of the cross section shown in FIG. 10.

FIG. 13 also shows the location and direction of the partial section view which is shown in FIG. 14.

BEST MODE OF CARRYING OUT THE INVENTION

Figure 1:
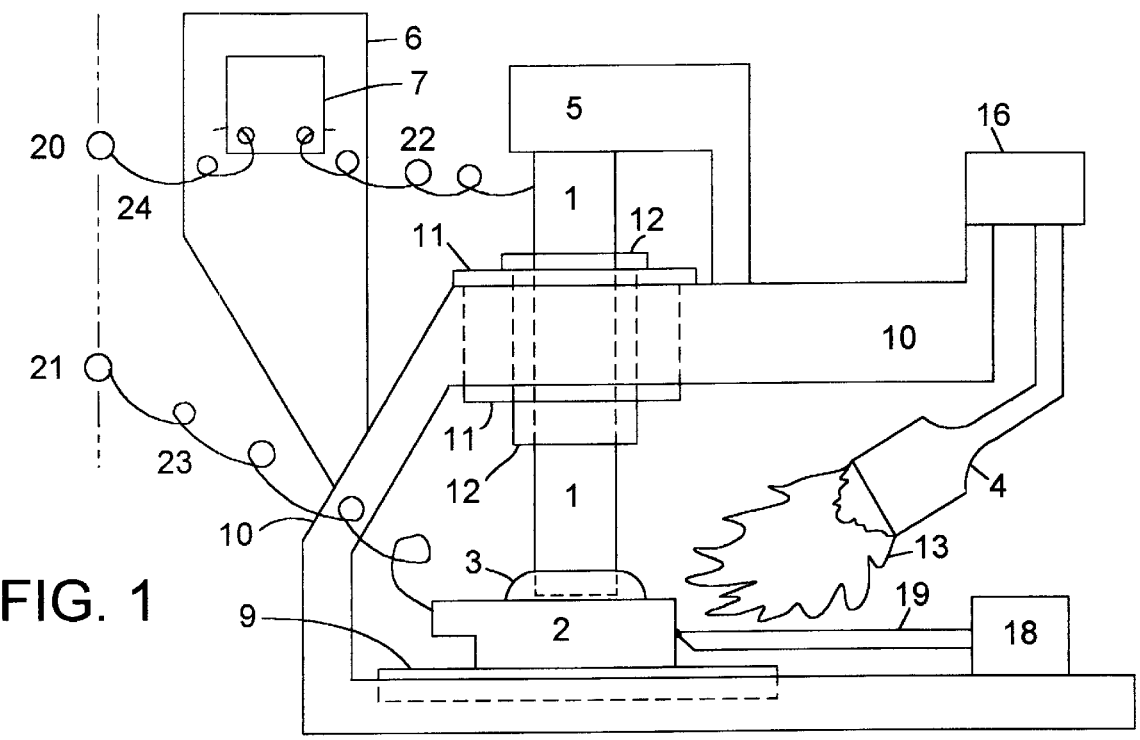
FIG. 1 is a single-cell battery in accordance with the present invention which is heated by a torch.

The preferred embodiment of the high temperature battery in accordance with the present invention is with copper as the metal of the cathode or positive electrode of each cell and aluminum as the metal of the anode or negative electrode of each cell. Both these metals have low electrical resistivity, which is expected to contribute toward a very desirable, low internal resistance for the battery, and both the metals are abundant and low-cost. Other metals of higher electrical resistivity which have been tested successfully are: nickel, iron and tin. It is believed that still other metals, metal alloys and metallic substances can be used as electrodes to make a high temperature battery in accordance with the present invention. The electrical resistivity, in microohm-centimeters at 20° C., of some metals selected for illustration, not intending to exclude others, are: m copper: 1.771; aluminum: 2.824; gold: 2.44; silver: 1.59; iron: 10; nickel: 7.8; magnesium: 4.6; phosphor-bronze: 7.8; tin: 11.5.

The high temperature battery of this invention is believed to be superior to previous thermal batteries, because the internal resistance is expected to be lower and the energy-to-weight ratio is expected to be higher. It is believed the previous thermal batteries use fused salt electrolytes with various electrode metals, and these fused salt electrolytes may have higher resistivity than the electrolyte of this invention, and the electrode metals may have higher resistivity than copper and aluminum. The borax electrolyte of this invention has an affinity for metal oxides, found in ashes and elsewhere, which metal oxides in thermistors have a negative temperature High Temperature Batio and Electrolytes, DIV, Aug. 1 coefficient of resistivity, and tobacco ashes have been shown by Bert Adams' prior battery art to be current-improving adders to an electrode, which is interpreted to be due to lower resistance of the electrode. Also, at high temperature, such as in the high temperature battery of this invention, the metal oxides, or ashes, added to the battery electrolyte cause lowered electrolyte resistance because of the negative temperature coefficient of resistivity of the metal oxides.

In the high temperature battery of this invention, the contact between the anode and cathode is through an oxide-removing flux fused to the cathode as an electrolyte. It is known that borax is a flux that removes oxides and is used in preparing metals to be joined by silver soldering. It is known that silver solder easily "wets" to copper through borax at a wetting temperature, because borax dissolves copper oxide. It is known that aluminum has a tenacious oxide that is dissolved by molten borax; thus, aluminum contacts copper electrically through molten borax. When an aluminum anode, or negative electrode, contacts a copper cathode, or positive electrode, through molten borax at temperatures above a 279° C. copper-cathode temperature, voltages in accordance with Table I are measured. In a cell of the high temperature battery of the present invention, a thin coating or film of oxide-removing flux (borax) remains between the anode and cathode electrodes when the electrodes are forced together; so, borax between the electrodes acts as an electrolyte between the anode and cathode.

The high temperature battery will be described by referring to FIG. 1, which shows a single, repeatable cell of such a battery. These cells may be series-additively connected to make multiple-cell batteries of higher voltages than the single-cell battery voltage. The anode 1 is held with respect to the cathode 2 by a structural member 10, which holds insulator 11, which holds guide 12, which holds the anode 1. The anode 1 is free to move within the guide 12. A cathode 2 is positioned and held on thermal and electrical insulator 9. A flux is placed on the cathode and wetted to the cathode by heat from flame 13 coming from torch nozzle 4; so, the flux is glassified. The anode 1 is pressed into the glassified flux 3 and toward the cathode 2 by force generator 5. At least a portion of the flux 3 must contact portions of both the cathode 2 and the anode 1 at their heated junction to obtain operation of the high temperature battery. The heat from flame 13 coming from torch nozzle 4 heats the junction of the cathode 2 and the anode 1 through flux 3. The heat from flame 13 coming from torch nozzle 4 is controlled by controller 16. The temperature sensor 19 senses the heated junction temperature, which is the anode-to-cathode junction temperature, by sensing the cathode 2 temperature. Temperature sensor 19 is connected to temperature controller and indicator 18. The heated junction temperature may be controlled manually by observing the indicator portion of the temperature controller and indicator 18, while manually operating controller 16, or over-riding controller 16. The heated junction temperature may be controlled automatically by causing the temperature controller portion of temperature controller and indicator 18 to operate the heat source controller 16. The anode 1 is connected to electrical conductor 22, which is made of the same metal as the anode 1. The conductor 22 connects to standard-material conductor 24 through intermediate material 7, which is supported by insulator 6. The conductor 24 connects to electrical terminal 20. The cathode 2 is connected to electrical conductor 23, which is the same metal as the cathode 2. The conductor 23 connects to electrical terminal 21. The preferred standard-material for conductors is copper.

Figure 11:
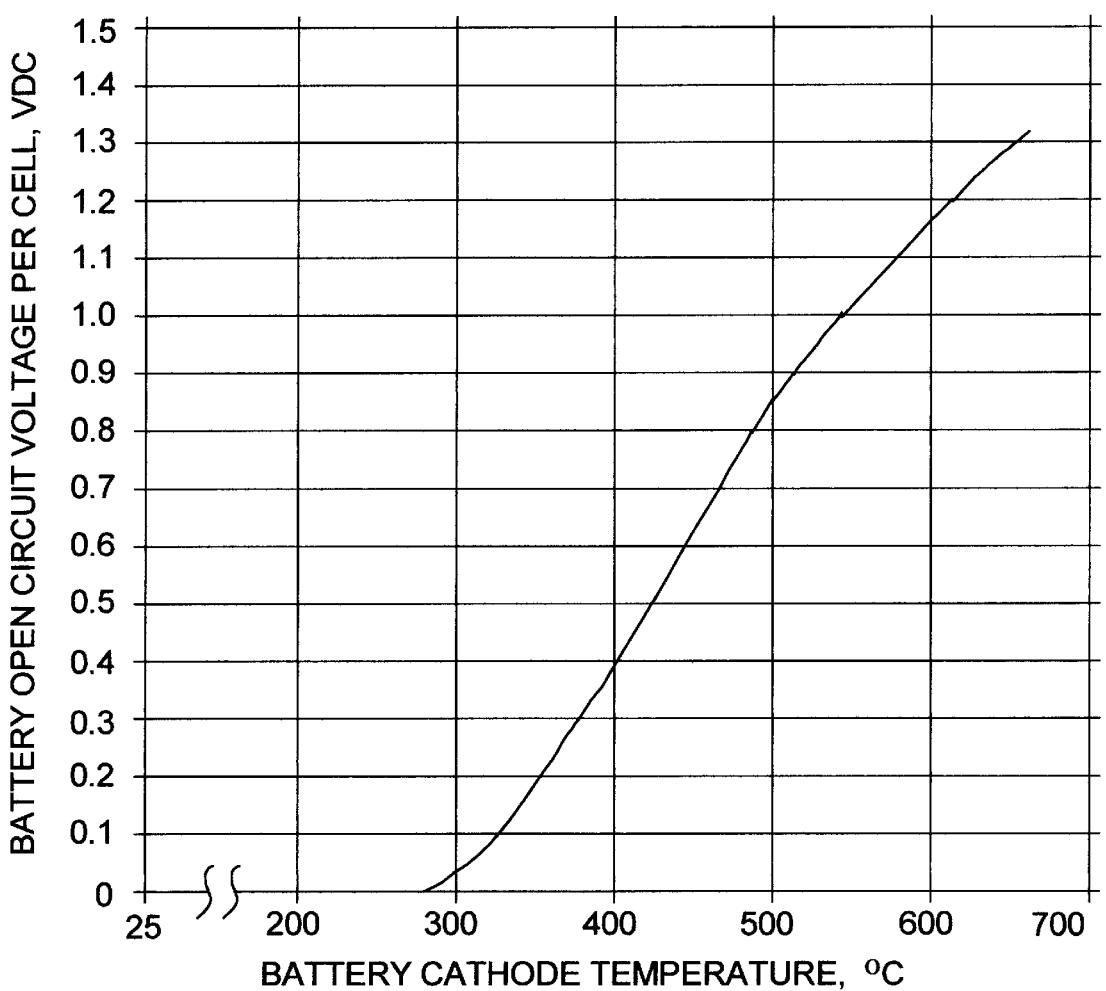
FIG. 11 shows the characteristic curve of battery open circuit voltage per cell versus battery cathode temperature of a high temperature battery in accordance with the present invention having a copper cathode, an aluminum anode and borax as the flux and borax fused on copper as the electrolyte.

The operation of the FIG. 1 high temperature battery is initiated by energizing the heat source flame 13 coming from torch nozzle 4 to raise the temperature of the cathode-2-to-anode-1 junction through glassified flux 3 above a threshold temperature. When the heated junction temperature is above the threshold temperature, a temperature-proportional voltage, such as shown in FIG. 11, will be available from the cell terminals 20 and 21.

Figure 2:
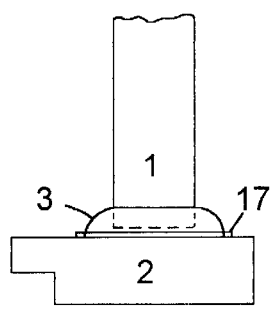
FIG. 2 shows silver solder wetted to an electrode of one cell of a high temperature battery in accordance with the present invention.

FIG. 2 shows a cathode 2 with silver solder 17 wetted to the cathode 2, and with the anode 1 in contact with the silver solder 17 through the glassified flux 3. This is an alternate cathode for the cathode shown in FIG. 1.

A multiple-cell, torch-heated, high temperature battery, composed of a plurality of FIG. 1 cells, may be heated with one torch which is moved between the cells to heat the anode-to-cathode junctions of various cells at various times to maintain the heated junctions of all cells above the threshold temperature. In this way, one torch may be used as the heat source for many cells.

Flames have forward and reverse electrical conduction properties similar to diodes. A single torch flame heating the heated junctions of a plurality of series-additive connected cells of a high temperature battery is expected to allow high voltage battery operation without significant degradation from the common, single flame until the reverse voltage breakdown of the flame is exceeded by the battery voltage. Stated another way, the number of cells of this high temperature battery which can be series-additively connected and continuously heated from a single torch flame is expected to be limited by the reverse voltage breakdown of the flame.

An electric resistance heater may be used as the heat source for a high temperature battery.

Figure 3:
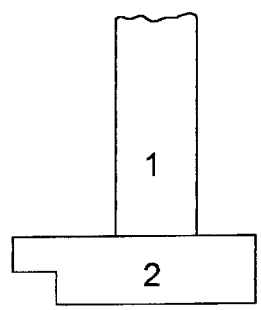
FIG. 3 shows a first electrode and a second electrode of a thermoelectric junction.

The FIG. 3 shows a first electrode 1 and a second electrode 2 without electrolyte between them; the FIG. 3 is a thermocouple.

Figure 4:
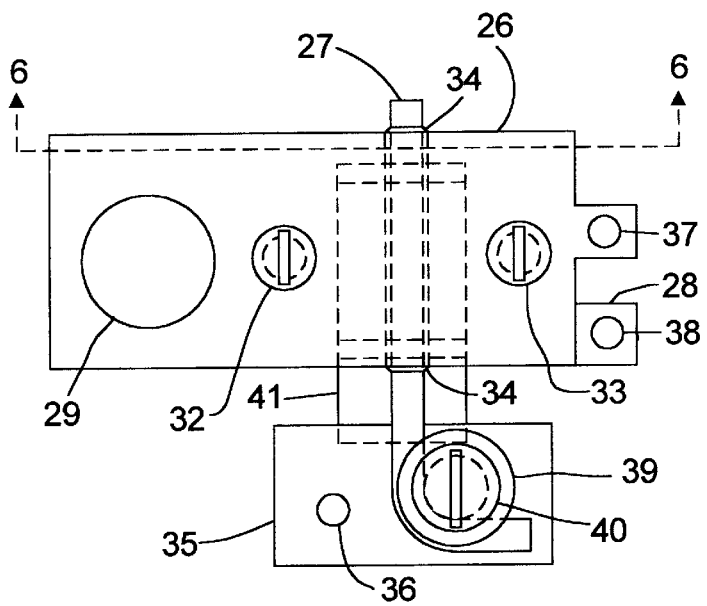
FIG. 4 is a top view of a single cell of a high temperature battery in accordance with the present invention.
Figure 5:
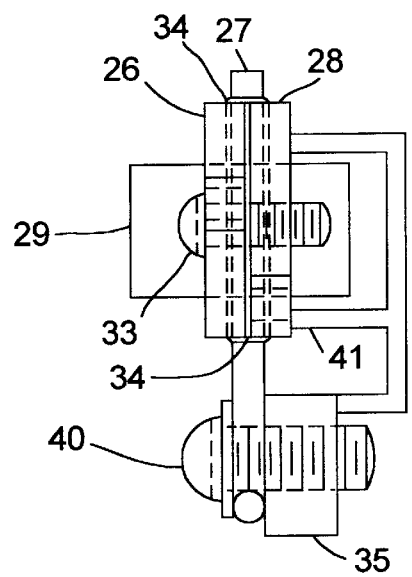
FIG. 5 is a side view of a single cell of a high temperature battery in accordance with the present invention, which also is shown from a top view in FIG. 4.
Figure 6:
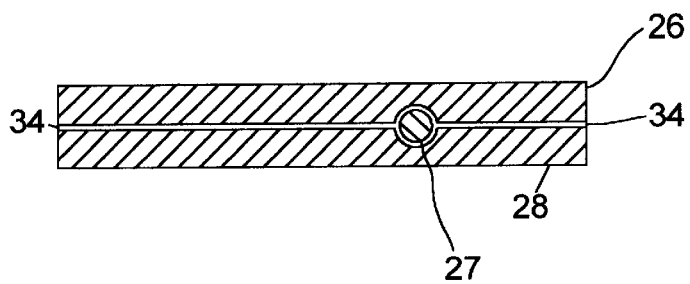
FIG. 6 is a cross-section view through a single cell of a high temperature battery in accordance with the present invention, which view is located by FIG. 4.

The FIG. 4, FIG. 5 and FIG. 6 show an assembled, single cell of a high temperature battery in accordance with present invention in which an anode electrode is sandwiched between two cathode electrodes, and one or both cathode electrodes have glassified flux fused to the electrode. These FIGS. 4, 5 and 6 show how a round anode may be placed in a hole, which hole was drilled along the interface between the two clamped cathode electrodes, and which hole has been filled with glassified flux fused to the cathodes after the manner shown in FIG. 7. Also, these FIGS. 4, 5 and 6 show a configuration in which the high-melting-temperature electrode can be heated with flux to fuse and glassify the flux to the electrode and that electrode temperature may be lowered below the melting temperature of the lowest-melting-temperature electrode and the fused and glassified flux may continue in a viscous state; so, the lowest-melting-temperature electrode may be placed in the viscous flux and positioned as shown in the FIGS. 4, 5 and 6. The FIGS. 4, 5 and 6 battery is supported by a high temperature electrical insulating support 41.

Figure 7:
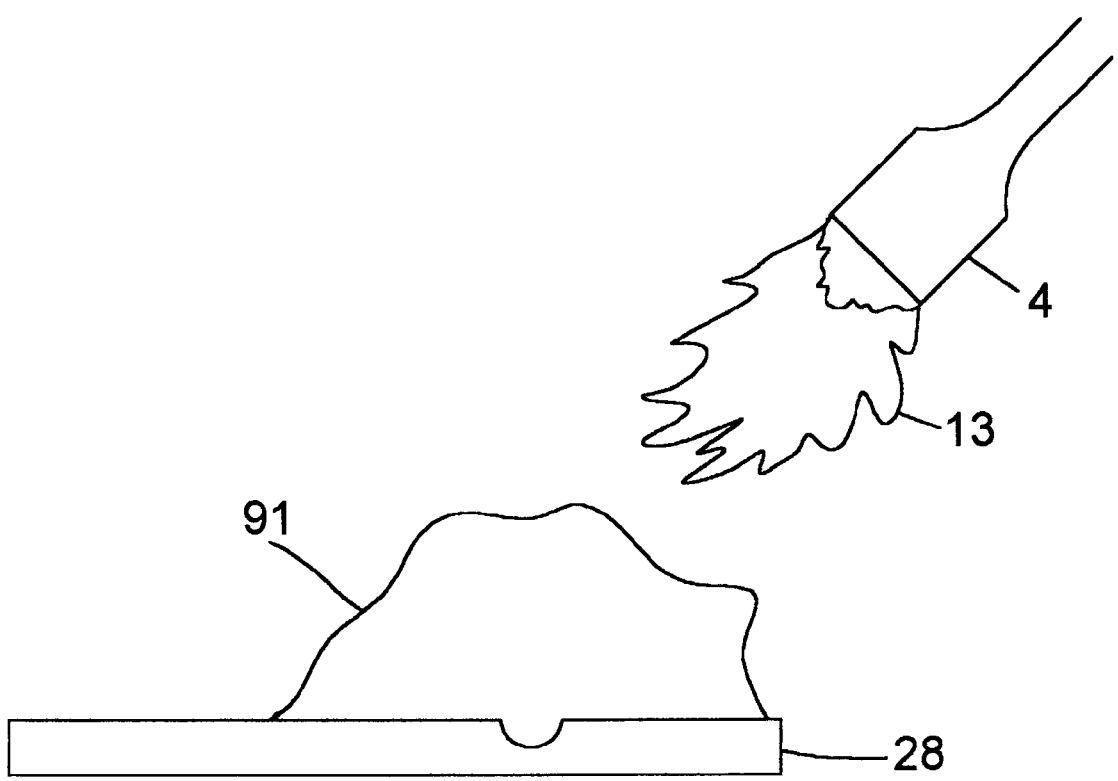
FIG. 7 shows heating of flux using a torch on half of a cathode from FIGS. 4, 5 and 6.

FIG. 4 shows a top view of a single-cell of a high temperature battery in which the anode 27 makes electrical battery contact with dual cathodes 26 and 28 through electrolyte 34. A heater 29, which may be a resistance heater, is thermally coupled to cathodes 26 and 28, and is electrically insulated from the cathodes 26 and 28 and from the electrolyte 34. The dual cathodes 26 and 28 are electrically connected by copper wire between holes 37 and 38. The anode 27 is connected to intermediate metal connector 35 by screw 40 and washer 39. The battery voltage is available between an electrical wire attached to the cathode holes 37-38 and an electrical wire attached to the connector hole 36 in intermediate metal connector 35. The electrolyte 34 is formed by heating borax to fuse to a thin glass on cathode 26 in the semicircular channel to be occupied by anode 27; such heating of borax is shown in FIG. 7; similarly, electrolyte 34 is formed by heating borax to fuse to a thin glass on cathode 28 in the semicircular channel to be occupied by anode 27. The anode 27 is then placed in the channel on either cathode 26 or 28 and the alternate cathode is assembled as shown in FIGS. 4, 5 and 6 and screws 32 and 33 are installed as shown. FIG. 6 shows a cross-section, identified on FIG. 4, of the relationships of anode 27, electrolyte 34 and cathodes 26 and 28. The electrolyte 34 may be heated to a viscous liquid to facilitate bringing the cathodes 26 and 28 closer together by tightening the screws 32 and 33.

FIG. 5 shows an end view of a single-cell of a high temperature battery in which the anode 27 makes electrical battery contact with dual cathodes 26 and 28 through electrolyte 34.

FIG. 6 shows a sectional view, located by FIG. 4, of a single-cell of a high temperature battery in which the anode 27 makes electrical battery contact with dual cathodes 26 and 28 through electrolyte 34.

FIG. 7 shows heat from flame 13 emitting from torch nozzle 4 heating flux 91 on electrode 28 toward glassification and becoming the electrolyte 34 in FIG. 4, FIG. 5 and FIG. 6.

Figures 8, 9:
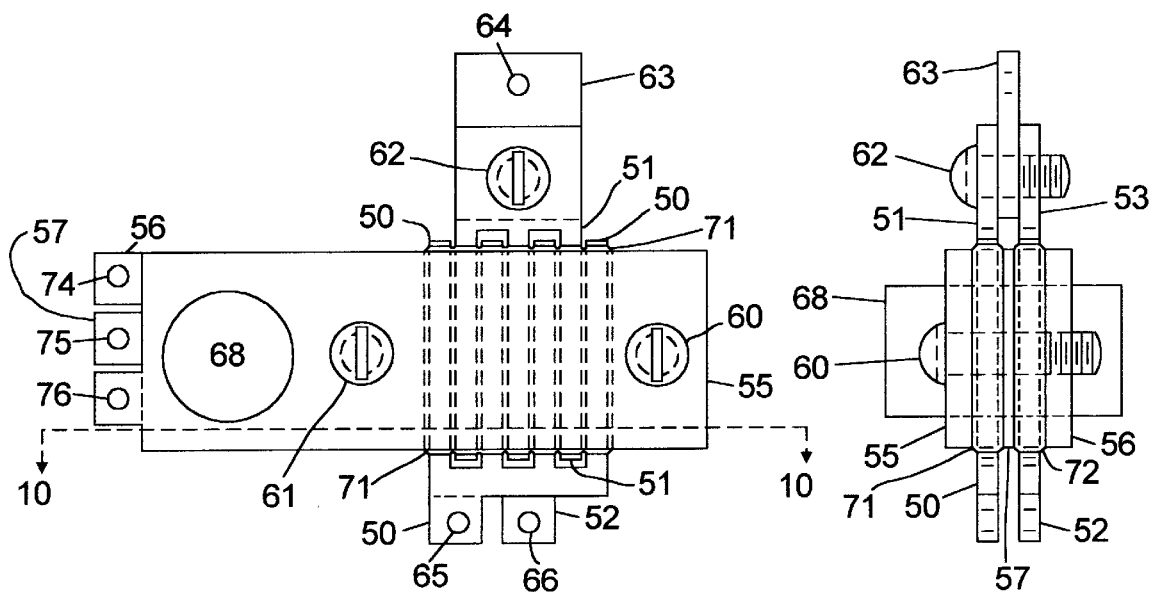
FIG. 8 shows a top view of a single cell of a high temperature battery in accordance with the present invention in which the anode and cathode electrodes are interdigitated and stacked. Also.
FIG. 9 shows a side view of a single cell of a high temperature battery in accordance with the present invention in which the anode and cathode electrodes are interdigitated and stacked, which is shown in top view in FIG. 8.
Figure 10:
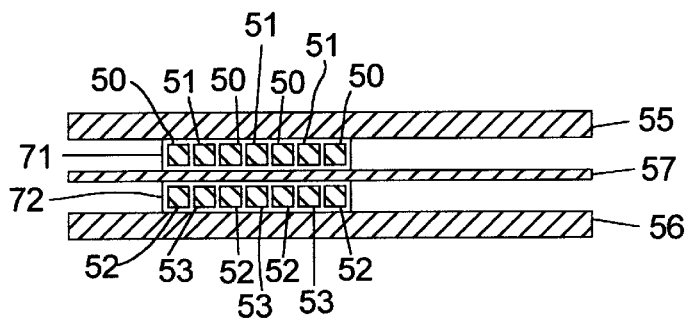
FIG. 10 shows a cross section of a single cell of a high temperature battery in accordance with the present invention in which the anode and cathode electrodes are interdigitated and stacked, which cross section is located in FIG. 8.

The FIG. 8, FIG. 9 and FIG. 10 show an assembled, single cell of a high temperature battery in accordance with the present invention in which the anode and cathode electrodes are interdigitated and stacked. These FIGS. 8, 9 and 10 show how square electrodes may be placed side-by-side and stacked to obtain a large area of anode-to-cathode junction and thus a large current generating capability. Also, these FIGS. 8, 9 and 10 show a configuration in which the high-melting-temperature electrode can be heated with flux to fuse and glassify the flux to the electrode and that electrode temperature may be lowered below the melting temperature of the lowest-melting-temperature electrode and the fused and glassified flux may continue in a viscous state; so, the lowest-melting-temperature electrode may be placed in the viscous flux, which is at a temperature which will not melt the electrode, and positioned as shown in the FIGS. 8, 9 and 10. The FIGS. 8, 9 and 10 battery is considered supported by a high temperature electrical insulating support such as 41 shown in FIGS. 4 and 5.

The FIG. 8 shows a top view of an assembled, single cell of a high temperature battery in accordance with present invention in which the anode and cathode electrodes are interdigitated and stacked. The battery voltage is available between an electrical connection between a five-member cathode with members 50, 52, 55, 56 and 57, and the electrical connection to a dual anode with members 51 and 53 (shown in FIG. 9) through an intermediate-metal member 63, to which dual anodes 51 and 53 are attached by screw 62 threaded into anode 53. The electrical connection between the five-member cathodes is made by silver soldering an electrical wire to the five members as follows: the electrical wire is silver soldered through hole 66 in member 52 to member 52 and through hole 65 in member 50 to member 50 and through hole 76 in member 55 to member 55 and through hole 75 in member 57 to member 57 and through hole 74 in member 56 to member 56. The electrical connection to the dual anode members 51 and 53 is made through a wire silver soldered through hole 64 in member 63. Screws 60 and 61 mechanically connect and hold members 55 and 56 in the positions shown in FIGS. 8, 9 and 10, and by holding members 55 and 56, the members 50, 51, 52, 53 and 57 are also held in the positions shown in FIGS. 8, 9 and 10. Heater 68, shown in FIG. 8 and FIG. 9, is an electrical resistance cartridge heater fitted to members 55, 56 and 57 to heat the anode-to-cathode junction; the electrical connections to heater 68 are not shown.

FIG. 9 shows an end view of the assembled, single cell of a high temperature battery shown in top view in FIG. 8.

FIG. 10 shows a sectional view of the assembled, single cell of a high temperature shown in FIG. 8 and FIG. 9. The direction of viewing the FIG. 10 section is shown in FIG. 8. The upper stack cathode elements are 50, 55, and 57; the lower stack cathode elements are 52, 56 and 57; cathode element 57 operates in both the upper stack and the lower stack. The cathode elements 50 and 52 each have four fingers. The upper stack anode element is 51; the lower stack anode element is 53. The anode elements 51 and 53 each have three fingers. The upper stack anode element 51 makes contact with the upper stack cathode elements through glassified flux 71. The lower stack anode element 53 makes contact with the lower stack cathode elements through glassified flux 72. Notice that the anode elements in FIG. 10 are surrounded by contacts to cathode elements through glassified flux. The fingers of the upper stack cathode 50 and upper stack anode 51 are interdigitated, or alternating across the upper stack. The fingers of the lower stack cathode 52 and lower stack anode 53 are interdigitated, or alternating across the lower stack.

Figure 12:
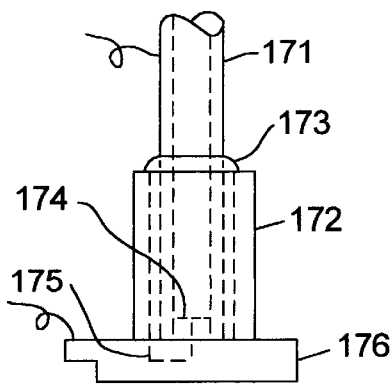
FIG. 12 shows a first, tube-like electrode surrounding and making a junction with a second, tube electrode through electrolyte placed between the electrodes of a high temperature battery in accordance with the present invention. The second tube electrode may convey electrolyte to the junction through its lumen.

The anodes and cathodes, one or both, for a high temperature battery in accordance with the present invention may also be fabricated from perforated material, meshes, tubes, wires, or other forms. One or both of the electrodes, anode and cathode, of a cell may be constructed as delivery means for flux or electrolyte by having the flux or electrolyte, in appropriate form, carried within cavities in the electrodes. Appropriate form means that escaping water or steam from heating of borax must be vented. FIG. 12 shows a tube-like cathode 172 with a tube anode 171 in the lumen of cathode 172. Cathode 172 is mechanically and electrically attached to plate 176; tube anode 171 is positioned within 172 by feature 174, a part of plate 176. An electrolyte 173 is between the cathode 172 and anode 171, and the anode 171 is butted against plate 176 through electrolyte 173. The plate 176 also includes a via 175. The electrolyte 173 may be conveyed through the lumen of anode tube 171 to between the cathode 172 and anode 171 through via 175. The anode 171 may be made of nickel to allow higher temperature operation to reduce the viscosity of the electrolyte.

The operating life of the high temperature battery is at least a function, an inverse function, of the heated junction temperature; the higher the heated junction temperature the shorter will be the expected life. In the copper-cathode and aluminum-anode, preferred embodiment of the battery, the aluminum anode has been observed to degrade more quickly, probably because the heat source has been a torch flame which produces high surface temperatures and the aluminum has been melted by the torch flame heat. Therefore, it is desirable to control the heated junction temperature at the lowest value that will generate the desired electrical output power. For the preferred embodiment, the open circuit cell voltage versus battery cathode temperature is shown in FIG. 11.

Figures 13, 14:
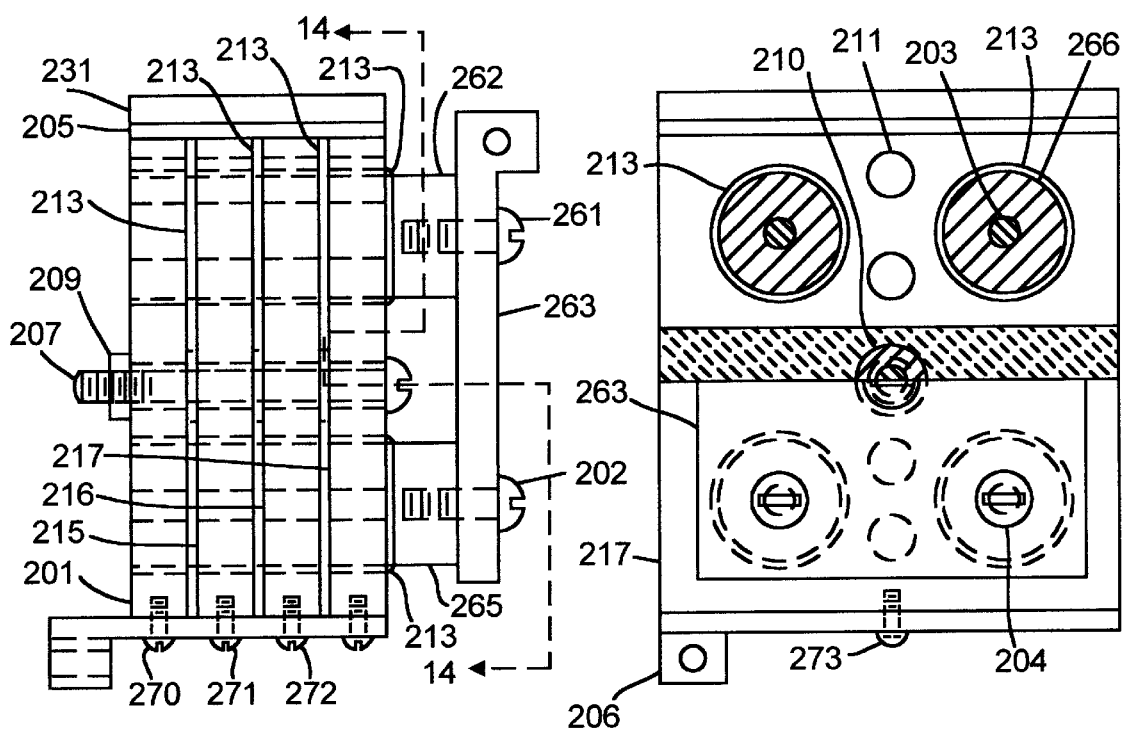
FIG. 13 and FIG. 14 show a side view and an end view with a partial section view, respectively, of a voltaic cell of a high temperature battery in accordance with the present invention.

A large area anode-to-cathode contact through electrolyte is necessary to obtain high current capability. One high temperature battery configuration for obtaining a large area of the anode-to-cathode contact through electrolyte is shown in FIG. 13 and FIG. 14. FIG. 13 shows a side view and FIG. 14 shows an end view with a partial section view of a voltaic cell of a high temperature battery in accordance with the present invention. The electrolyte 213 is formed on the flat plates. The electrolyte 213 is formed by heating borax to fuse to a thin glass on the flat plates, 201, 215, 216 and 217. The electrolyte 213 may be heated to a viscous liquid to facilitate spreading the electrolyte on the plate, filling the holes for the anodes, and to facilitate bringing the cathodes closer together, as allowed by a spacer washer such as 210, by tightening the screw 207. This voltaic cell is operative above a certain temperature, as indicated in FIG. 11, and has an anode, a cathode, an electrolyte, a heater, and electrical connections. The cathode is composed of four flat plates, 201, 215, 216 and 217, not intending to exclude more or fewer than four, stacked with electrolyte 213 and a spacer washer, one of which is 210, between each plate, and the plates are mechanically connected by a screw 207 through the spacer washers and the centers of the plates, and secured by a nut 209. Each plate has holes for lightening and storing electrolyte 213; one such hole is labelled 211. A cathode electrical connection 206 to all the cathode plates is made by electrically connecting each cathode plate to the cathode electrical connection member 206; for connecting four plates, four connecting screws 270, 271, 272 and 273 are shown; screw 270 connects member 206 to cathode plate 201, and similarly, screws 271, 272 and 273 connect cathode plates 215, 216 and 217, respectively, to member 206. The anode is a group of four circular rods, not intending to exclude more or less than four, three of which are labelled 262, 265 and 266; these four anode rods are placed in proximity to the cathode plates to make an anode-to-cathode contact through electrolyte 213 by placing the rods in electrolyte-lined holes in the cathode plates. An anode electrical connection to all the anode rods is made by electrically connecting each anode rod to the anode electrical connection member 263; for connecting four rods, four connecting screws, 261, 202, 203 and 204, are shown; screw 261 connects member 263 to anode rod 262; screw 202 connects member 263 to anode rod 265; screw 203 connects member 263 to anode rod 266; screw 204 connects member 263 to the fourth anode rod. The heater 231 is thermally connected to the cathode plates, 201, 215, 216 and 217, by the thermal conductor and electrical insulator 205, which may be a ceramic. The current-generating capability of this high temperature battery cell is determined by the area of the anode-to-cathode contact through the electrolyte 213. Various areas of anode-to-cathode contacts can be obtained, and thus, various current-generating capabilities can be obtained by various anode rod diameters and respective cathode hole diameters, various cathode-hole-to-cathode-hole spacings, as well as by various numbers of anode rods, cathode plates and holes in the cathode plates.

FIG. 14 shows a partial end view and a partial section of the voltaic cell of a high temperature battery in accordance with the present invention shown in side view in FIG. 13.

Variable Battery

Figure 15:
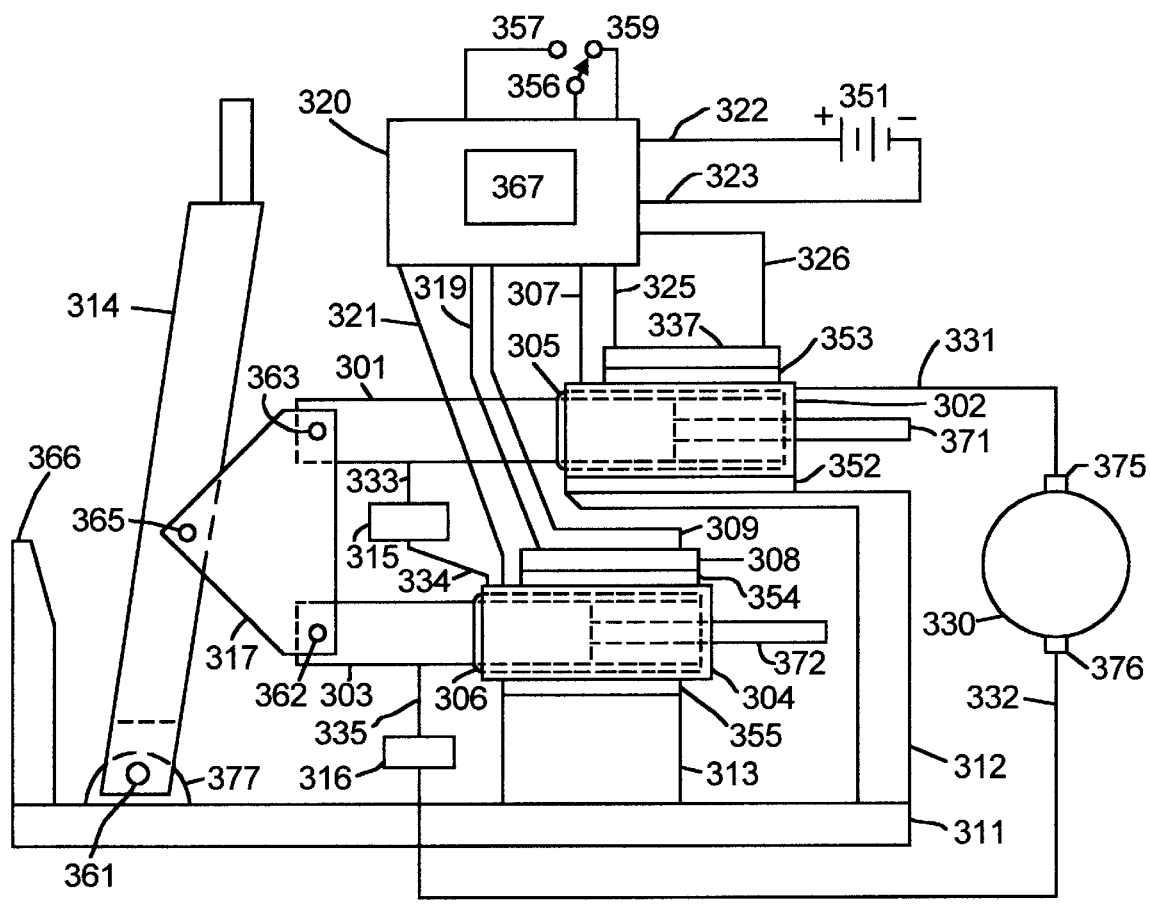
FIG. 15 shows a variable battery in accordance with the present invention which is connected as a motor controller.

The variable battery will be described by referring to FIG. 15. The variable battery operates in basically two modes: one, by varying the cathode temperature to vary the output voltage, and two, by varying the area of anode-to-cathode contacts through electrolyte to vary the current generating capability; it is possible to operate in both modes together, by varying the cathode temperature and the area of the anode-to-cathode contacts. FIG. 15 shows a two-cell, series-connected, variable high temperature battery in accordance with the present invention connected to control an electric motor; the torque generated by the motor is a function of current through the motor. A variable battery motor controller is comprised as follows. A first cell of the battery comprises a cathode 302, considered to be made of copper, an anode 301, considered to be made of aluminum, and an electrolyte 305, considered to be glassified borax; a second cell of the battery comprises a cathode 304, considered to be made of copper, an anode 303, considered to be made of aluminum, and an electrolyte 306, considered to be glassified borax. The electrolytes 305 and 306 are formed by heating borax to fuse to a thin glass within the cathodes 302 and 304. The electrolytes 305 and 306 may be heated to a viscous liquid to facilitate movement of the respective anodes within the respective cathodes; anode 301 is within cathode 302, and anode 303 is within cathode 304. To series-connect the first and second cells, the anode 301 is connected to cathode 304 through the series connection of wire 333, considered to be aluminum, intermediate metal member 315, considered to be brass, and wire 334, considered to be copper. The cathode 302 is connected to terminal 375 of motor 330 by wire 331, considered to be copper. The anode 303 is connected to terminal 376 of motor 330 through the series connection of wire 335, considered to be aluminum, intermediate metal member 316, considered to be brass, and wire 332, considered to be copper. The cathodes 302 and 304 are each tube-like, open at one end with a diameter to admit and loosely fit the rod-like anodes 301 and 303, respectively, and with closures at the other end, and with smaller diameter holes in the center of the closures, to have sliding fits with rod-like, electrically insulating, anode guides 371 and 372, respectively. The cathode 302 is mechanically connected to a reference plate 311 through mechanical member 312 and thermal and electrical insulator 352. Similarly, the cathode 304 is mechanically connected to the reference plate 311 through mechanical member 313 and thermal and electrical insulator 355. The anodes 301 and 303 are each of a diameter to fit the inside diameter of the tube-like cathodes with a cylindrical space allowed for the electrolytes 305 and 306, and of a length sufficient to provide adequate area between anode and cathode for desired current-generating capability as well to accommodate the desired anode-to-cathode movement. Attached to anode 301 is electrically insulating guide 371, and attached to anode 303 is electrically insulating guide 372; the guides 371 and 372 are of a diameter to have sliding fits in respective guide holes in the cathodes closures and of a length sufficient to accommodate the desired anode-to-cathode movement. The anodes have diametrical holes, at the ends opposite to the guides, to attach mechanical-linkage connecting pins, one through each anode, to allow moving the anodes when the electrolytes are soft enough; the connecting pin 363 is attached to anode 301, and the connecting pin 362 is attached to anode 303. The connecting pins 363 and 362 attach the anodes to linkage member 317; the assembly of the connecting pins and the linkage member are constructed to electrically insulate anode 301 from anode 303. Linkage member 317 is connected by pin 365 to operating arm 314. Operating arm 314 is attached by pin 361 to member 377 which is attached to reference plate 311; pin 361 is also a pivot for arm 314. Movement of the operating arm 314 about pivot pin 361 causes movement of the anodes 301 and 302 inside cathodes 302 and 304, respectively, when the electrolytes 305 and 306 are soft enough. The auxiliary battery 351 is connected to the controller 320 by lines 322 and 323, and is switched through controller 320 to energize electric heaters on the cathodes to raise the temperature of the cathodes, the anodes and the electrolytes between the cathodes and the anodes. The controller 320 and temperature set point 367 establishes and controls the temperature of the cathodes to be the desired values. The electric heater 308 is electrically insulated from, and thermally connected to, cathode 304, by a thermally conducting electrical insulator 354, which insulator may be made from a ceramic material. The heater 308 is connected by wires 309 and 319 to controller 320. The cathode 304 has a temperature sensor and connecting lines labelled 321 for measuring and transmitting the cathode 304 temperature to the controller 320. The electric heater 337 is electrically insulated from, and thermally connected to, cathode 302 by insulator 353, which insulator may be made of ceramic material. The heater 337 is connected by wires 325 and 326 to controller 320. The cathode 302 has a temperature sensor and connecting lines labelled 307 for measuring and transmitting the cathode 302 temperature to the controller 320.

Operation is as follows. The controller 320 receives a start, or operate, command from switch 356 being switched from a 357 OFF position to a 359 OPERATE position. The controller 320 receives power from battery 351 via wires 322 and 323 and applies controlled power to the heater 308 through wires 309 and 319 and to the heater 337 through wires 325 and 326.

Operation for control of battery voltage by controlling temperature of the cathodes can be done with the operating arm 314 in any position, but it is favored to be in the position shown in FIG. 15 or in a position to the right of the position shown. For copper cathodes and aluminum anodes, the voltage generated by both battery cells will be determined by temperature as indicated in FIG. 11. By increasing heating of the cathodes, the cathodes, the anodes and the electrolytes temperatures will increase above the threshold temperature, the current through the motor will increase, and the torque generated by the motor will increase. By reducing heating of the cathodes, the cathodes, the anodes and the electrolytes temperatures will be reduced, the voltage generated by the two-cell battery will be reduced, which will reduce the current through the motor, which will reduce the torque generated by the motor.

Operation for control of current generating capability starts with the operating arm 314 positioned to the left in FIG. 15 against the stop 366; so, the current-generating capability of both cells is zero or very small by the anode 301 being almost withdrawn from cathode 302, but retained by guide 371 in a hole in the right end of cathode 302, and by the anode 303 being almost withdrawn from cathode 304, but retained by guide 372 in a hole in the right end of cathode 304. This is the zero, or minimum, current-generating-capability position. The guides 371 and 372 maintain the anodes centered in the cathodes and electrically insulated from the cathodes. When the temperatures of the cathodes are in the operating range and the electrolytes are soft enough, moving the operating arm 314 to the right in FIG. 15 will increase the area of the anode-to-cathode contact through the electrolyte, which will increase the current generating capability of the two-cell, variable battery; similarly, moving the operating arm 314 to the left in FIG. 15 will decrease the area of the anode-to-cathode contact through the electrolyte, which will decrease the current generating capability of the two-cell, variable battery. In this way, the current available to the motor and the torque of motor 330 will be controlled. The electrolyte will be viscous, soft enough, in a portion of the operating temperature range shown in FIG. 11.

The variable battery movement of the anode with respect to the cathode indicates how the glassified electrolyte in an anode-to-cathode contact may be changed, because electrolyte carried on the movable anode may move into cathode contact.

The operating life of the high temperature battery may be improved by replacing used-portions of an electrode with unused-portions of the same electrode by moving the electrode with respect to the second electrode. The replacement can be done while the heat-activated flux and electrolyte is hot enough to be soft enough to allow movement of one metal electrode with respect to the other metal electrode. The storage of unused metal electrodes and the store of used metal electrodes and the actuation to move electrodes from storage to use and use to storage can be considered referring to FIG. 15. A storage means for unused metal electrode means may be that which holds and positions the electrode 301 that has not been contacted by the electrode 302 through the electrolyte. A first storage means for unused metal electrode means may be that which holds and positions the electrode 301 to the left of electrode 302 in FIG. 15; a second storage means for removed metal electrode may be conceptualized to be that which holds and positions the electrode 301 to the right of electrode 302 in FIG. 15. An actuation means for moving the first metal electrode means with respect to the second metal electrode means may be any means of moving, such as the arm 314, linkage 317, pivot 361 and associated structure in FIG. 15.

Industrial Applicability

The applicability and suitability of the high temperature battery to industrial applications has not been determined, although the solicitations for property rights statement stated "The subject matter of this application appears to 'have significant utility in the conduct of aeronautical and space activities'". This battery is believed to have the potential for an improved energy-to-weight ratio over currently used and known batteries.

An object of this invention is to provide an improved battery which will advance the use of electric-powered vehicles. The following excerpts from "The Charge of the Future" booklet published by the U.S. Department of Energy as DOE/CS-0107, September 1979, states the need for an improved battery for this use. "The characteristics of batteries commercially available today severely limit the performance of electric vehicles", from page 50. Program objectives have been established (under Public Law 94-413) to "develop (with the assistance of industry) improved batteries, motors, controllers, and other components that will help to broaden the applicability of electric and hybrid vehicles by increasing performance and lowering cost", from page 30. "Substituting electric vehicles for gasoline-powered vehicles, where practical, could result in substantial petroleum savings.", from page 24.

I claim as my invention:

1. An electric battery having a terminal means comprising a positive terminal and a negative terminal and means for respectively connecting the terminal means through at least one voltaic cell, wherein a voltaic cell comprises:

a pair of dissimilar metal electrodes means, comprising a first metal electrode means and a second metal electrode means, one functioning as an anode means and the other functioning as a cathode means;

a heat-activated flux and electrolyte means which fuses to a glass after being once heat-activated and which attaches to and cleans and frees from oxides at least one portion of at least one surface of the first metal electrode means and which attaches to and cleans and frees from oxides at least one portion of from none to at least one of the surfaces of the second metal electrode means and becomes an ionic conductor throughout an operating temperature range;

a catalyst means admixed with the heat-activated flux and electrolyte means prior to the heat-activated flux and electrolyte means being once heat-activated;

a contact means to cause electrical contact of the first metal electrode means with the second metal electrode means through the heat-activated flux and electrolyte means and the catalyst means attached to at least one of the dissimilar metal electrode means; and a means to heat the first metal electrode means and the second metal electrode means and the heat-activated flux and electrolyte means and the catalyst means in contact with both the dissimilar metal electrode means to a temperature which produces voltaic voltage between the pair of dissimilar metal electrode means in excess of a respective thermoelectric voltage; wherein, voltaic voltage is delivered with respective polarity to the terminal means.

2. An electric battery according to claim 1 wherein the catalyst means is vegetable-growth ashes means comprising varying amounts of potassium oxide, sodium oxide, calcium oxide, magnesium oxide, iron oxide, a salt of sulphuric acid, silica, carbon dioxide, lithium carbonate and phosphoric acid.

3. An electric battery according to claim 1 wherein the catalyst means is tobacco ashes.

4. An electric battery according to claim 1 wherein the heat-activated flux and electrolyte means and the catalyst means are seventy-one percent zinc chloride and twenty-nine percent ammonium chloride.

5. An electric battery according to claim 1 wherein the heat-activated flux and electrolyte means and the catalyst means are lithium fluoride.

6. An electric battery according to claim 1 wherein the catalyst means comprise lithium carbonate.

7. An electric battery according to claim 1 wherein the catalyst means comprise potassium carbonate.

8. An electric battery according to claim 1 wherein the heat-activated flux and electrolyte means is borax and the catalyst means is tobacco ashes.

9. An electric battery according to claim 1 wherein the heat-activated flux and electrolyte means is borax and the catalyst means is vegetable-growth ashes means comprising varying amounts of potassium oxide, sodium oxide, calcium oxide, magnesium oxide, iron oxide, a salt of sulphuric acid, silica, carbon dioxide, lithium carbonate and phosphoric acid.

10. An electric battery according to claim 1 wherein the catalyst means are up to five percent by weight of the combined weight of heat-activated flux and electrolyte means and catalyst means.

11. An electric battery according to claim 1 wherein the catalyst means are between five percent and thirty percent by weight of the combined weight of heat-activated flux and electrolyte means and catalyst means.

12. An electric battery according to claim 1 wherein the catalyst means are between thirty percent and fifty percent by weight of the combined weight of heat-activated flux and electrolyte means and catalyst means.

13. An electric battery according to claim 1 wherein the heat-activated flux and electrolyte means and the catalyst means are calcium fluoride.

14. An electric battery according to claim 1 wherein the heat-activated flux and electrolyte means and the catalyst means are sodium fluoaluminate.

15. An electric battery according to claim 1 wherein the heat-activated flux and electrolyte means and the catalyst means are calcium chloride fluoride orthophosphate.

16. An electric battery according to claim 1 wherein the heat-activated flux and electrolyte means and the catalyst means are barium fluoride.

17. An electric battery according to claim 1 wherein the heat-activated flux and electrolyte means and the catalyst means are strontium fluoride.

18. An electric battery according to claim 1 wherein the heat-activated flux and electrolyte means and the catalyst means are lead fluoride.

19. An electric battery acccording to claim 1 wherein the heat-activated flux and electrolyte means and the catalyst means are sodium fluoride.

20. An electric battery having a terminal means comprising a positive terminal and a negative terminal and means for respectively connecting the terminal means through at least one voltaic cell, wherein a voltaic cell comprises:

a pair of dissimilar metal electrodes means, comprising a first metal electrode means and a second metal electrode means, one functioning as an anode means and the other functioning as a cathode means;

a heat-activated flux and electrolyte means which fuses to a glass after being once heat-activated and which attaches to and cleans and frees from oxides at least one portion of at least one surface of the first metal electrode means, and which attaches to and cleans and frees from oxides at least one portion of from none to at least one of the surfaces of the second metal electrode means and becomes an ionic conductor throughout an operating temperature range;

a catalyst means sprinkled on the heat-activated flux and electrolyte means after the heat-activated flux and electrolyte means being once heat-activated;

a contact means to cause electrical contact of the first metal electrode means with the second metal electrode means through the heat-activated flux and electrolyte means and the catalyst means attached to at least one of the dissimilar metal electrode means; and a means to heat the first metal electrode means and the second metal electrode means and the heat-activated flux and electrolyte means and the catalyst means in contact with both the dissimilar metal electrode means to a temperature which produces voltaic voltage between the pair of dissimilar metal electrode means in excess of a respective thermoelectric voltage; wherein, voltaic voltage is delivered with respective polarity to the terminal means.

21. An electric battery according to claim 20 wherein the catalyst means is vegetable-growth ashes means comprising varying amounts of potassium oxide, sodium oxide, calcium oxide, magnesium oxide, iron oxide, a salt of sulphuric acid, silica, carbon dioxide, lithium carbonate and phosphoric acid.

22. An electric battery according to claim 20 wherein the catalyst means comprise lithium carbonate.

23. An electric battery according to claim 20 wherein the catalyst means comprise potassium carbonate.

24. An electric battery according to claim 20 wherein the heat-activated flux and electrolyte means is borax and the catalyst means is vegetable-growth ashes means comprising varying amounts of potassium oxide, sodium oxide, calcium oxide, magnesium oxide, iron oxide, a salt of sulphuric acid, silica, carbon dioxide, lithium carbonate and phosphoric acid.

25. An electric battery according to claim 20 wherein the heat-activated flux and electrolyte means is borax and the catalyst means is tobacco ashes.

26. An electric battery according to claim 20 wherein the catalyst means is tobacco ashes.

27. An electric battery having a terminal means comprising a positive terminal and a negative terminal and means for respectively connecting the terminal means through at least one voltaic cell, wherein a voltaic cell comprises:

a pair of dissimilar metal electrodes means, comprising a first metal electrode means and a second metal electrode means, one functioning as an anode means and the other functioning as a cathode means;

a heat-activated flux and electrolyte means which fuses to a glass after being once heat-activated and which attaches to and cleans and frees from oxides at least one portion of at least one surface of the first metal electrode means, and which attaches to and cleans and frees from oxides at least one portion of from none to at least one surface of the second metal electrode means and becomes an ionic conductor throughout an operating temperature range;

a silver solder means which melts and fuses to the first metal electrode means under the attached heat-activated flux and electrolyte means when heated above the wetting temperature of the silver solder means to the first metal electrode means;

a catalyst means included with the heat-activated flux and electrolyte means;

a contact means to cause electrical contact of the first metal electrode means-with the second metal electrode means through the silver solder means and the heat-activated flux and electrolyte means and the catalyst means attached to at least one of the dissimilar metal electrode means; and a means to heat the first metal electrode means and the silver solder means and the second metal electrode means and the heat-activated flux and electrolyte means and the catalyst means in contact with both the dissimilar metal electrode means to a temperature which produces voltaic voltage between the pair of dissimilar metal electrode means in excess of a respective thermoelectric voltage; wherein, voltaic voltage is delivered with respective polarity to the terminal means.

28. An electric battery having a terminal means comprising a positive terminal and a negative terminal and means for respectively connecting the terminal means through at least one voltaic cell, wherein a voltaic cell comprises:

a pair of dissimilar metal electrodes means, comprising a first metal electrode means and a second metal electrode means, one functioning as an anode means and the other functioning as a cathode means;

a heat-activated flux and electrolyte means which fuses to a glass after being once heat-activated and which attaches to and cleans and frees from oxides at least one portion of at least one surface of the first metal electrode means, and which attaches to and cleans and frees from oxides at least one portion of from none to at least one surface of the second metal electrode means and becomes an ionic conductor throughout an operating temperature range;

a silver solder means which melts and fuses to the first metal electrode means under the attached heat-activated flux and electrolyte means when heated above the wetting temperature of the silver solder means to the first metal electrode means;

a contact means to cause electrical contact of the first metal electrode means with the second metal electrode means through the silver solder means and the heat-activated flux and electrolyte means attached to at least one of the dissimilar metal electrode means; and a means to heat the first metal electrode means and the silver solder means and the second metal electrode means and the heat-activated flux and electrolyte means in contact with both the dissimilar metal electrode means to a temperature which produces voltaic voltage between the pair of dissimilar metal electrode means in excess of a respective thermoelectric voltage; wherein, voltaic voltage is delivered with respective polarity to the terminal means.

29. An electric battery having a terminal means comprising a positive terminal and a negative terminal and means for respectively connecting the terminal means through at least one voltaic cell, wherein a voltaic cell comprises:

a pair of dissimilar metal electrodes means, comprising a first metal electrode means and a second metal electrode means, one functioning as an anode means and the other functioning as a cathode means;

a heat-activated flux and electrolyte means which fuses to a glass after being once heat-activated and which attaches to and cleans and frees from oxides at least one portion of at least one surface of the first metal electrode means, and which attaches to and cleans and frees from oxides at least one portion of from none to at least one surface of the second metal electrode means and becomes an ionic conductor throughout an operating temperature range, further comprising add means for adding heat-activated flux and electrolyte means prior to being once heat-activated, and removal means for removing heat-activated flux and electrolyte means which have been once heat-activated;

a contact means to cause electrical contact of the first metal electrode means with the second metal electrode means through the heat-activated flux and electrolyte means attached to at least one of the dissimilar metal electrode means; and a means to heat the first metal electrode means and the second metal electrode means and the heat-activated flux and electrolyte means in contact with both the dissimilar metal electrode means to a temperature which produces voltaic voltage between the pair of dissimilar metal electrode means in excess of a respective thermoelectric voltage; wherein, voltaic voltage is delivered with respective polarity to the terminal means.

30. An electric battery having a terminal means comprising a positive terminal and a negative terminal and means for respectively connecting the terminal means through at least one voltaic cell, wherein a voltaic cell comprises:

a pair of dissimilar metal electrodes means, comprising a first metal electrode means and a second metal electrode means, one functioning as an anode means and the other functioning as a cathode means;

the first metal metal electrode means comprises a heat-activated flux and electrolyte means which fuses to a glass after being once heat-activated and which attaches to and cleans and frees from oxides at least two portions on at least one surface of the first metal electrode means and which attaches to and cleans and frees from oxides at least one portion of from none to at least one of the surfaces of the second metal electrode means and becomes an ionic conductor throughout an operating temperature range;

a contact means to cause electrical contact between the second metal electrode means and the first metal electrode means through at least one portion of the heat-activated flux and electrolyte means attached to the first metal electrode means;

a means to heat the first metal electrode means and the second metal electrode means and the heat-activated flux and electrolyte means in contact with both the dissimilar metal electrode means to a temperature which produces voltaic voltage between the pair of dissimilar metal electrode means in excess of a respective thermoelectric voltage;

a displacement means to move the first metal electrode means with respect to the second metal electrode means to bring at least one unused portion of heat-activated flux and electrolyte means attached to the first metal electrode means to the contact means and remove at least one portion of the heat-activated flux and electrolyte means attached to the first metal electrode means from the contact means, wherein the displacement means comprises:

a first storage means for unused first metal electrode means;

a second storage means for removed first metal electrode means;

an actuation means for moving the first metal electrode means with respect to the second metal electrode means, from the first storage means to the contact means and from the contact means into the second storage means, or vice versa, when the pair of dissimilar metal electrodes and the heat-activated flux and electrolyte means are at a temperature in the operating temperature range; wherein, voltaic voltage is delivered with respective polarity to the terminal means.

31. An electric battery according to claim 20 wherein the first metal electrode means includes cavity means for retaining heat-activated flux and electrolyte means.

* * * * *